(12) United States Patent
Roach et al.

(10) Patent No.: US 11,833,105 B1
(45) Date of Patent: Dec. 5, 2023

(54) OMNIDIRECTIONAL SAFETY WALKER

(71) Applicant: Jeffrey C. Roach LLC, Chestnut Hill, MA (US)

(72) Inventors: Jeffrey Curtis Roach, Chestnut Hill, MA (US); Aaron Guerrero Flores, Austin, TX (US); David Dong Wang, Westwood, MA (US)

(*) Notice: Subject to any disclaimer, the term of this patent is extended or adjusted under 35 U.S.C. 154(b) by 4 days.

(21) Appl. No.: 17/582,174

(22) Filed: Jan. 24, 2022

Related U.S. Application Data (60) Provisional application No. 63/140,949, filed on Jan. 24, 2021.

(51) Int. Cl.
| | | |
|---|---|---|
| *A61H 3/04* | (2006.01) | |
| *B60B 33/08* | (2006.01) | |
| *B60B 33/00* | (2006.01) | |
| *H02K 7/18* | (2006.01) | |
| *H02N 2/18* | (2006.01) | |

(52) U.S. Cl.
CPC .......... *A61H 3/04* (2013.01); *B60B 33/0081* (2013.01); *B60B 33/0089* (2013.01); *B60B 33/08* (2013.01); *H02K 7/1846* (2013.01); *H02N 2/186* (2013.01); *A61H 2003/046* (2013.01); *A61H 2201/1635* (2013.01); *A61H 2201/1673* (2013.01); *B60B 2200/26* (2013.01); *B60B 2900/3312* (2013.01)

(58) Field of Classification Search
CPC .......... A61H 3/04; A61H 2003/046; A61H 2201/1673; B60B 33/0089; B60B 33/08
See application file for complete search history.

(56) References Cited

U.S. PATENT DOCUMENTS

| | | | | |
|---|---|---|---|---|
| 2,613,389 | A * | 10/1952 | Cramer | B60B 33/06 182/194 |
| 3,391,930 | A | 7/1968 | Weissman | |
| 5,001,808 | A * | 3/1991 | Chung | B60B 33/06 16/33 |
| 5,636,651 | A * | 6/1997 | Einbinder | A61H 3/04 135/65 |
| 6,473,935 | B1 * | 11/2002 | Cherukuri | B60B 33/0063 16/33 |
| 7,179,200 | B1 * | 2/2007 | Wu | A61H 3/04 280/87.041 |
| 7,588,043 | B1 * | 9/2009 | Bais | A61H 3/04 482/68 |
| 7,743,780 | B1 * | 6/2010 | Eggan | A61H 3/00 137/66 |

(Continued)

*Primary Examiner* — Erez Gurari (57) ABSTRACT

A safety walker having a frame with a set of spherical caster wheels connected to the lower portion of the frame to provide omnidirectional movement with reduced force. A braking system is provided, where when a weight exceeding a threshold weight is applied to the frame, the brake is engaged to inhibit movement of the walker on the ground. The brake may use a mechanism in which each spherical caster wheel is retractably mounted within a lower end of a corresponding leg of the frame. Each spherical wheel is spring-loaded to urge the spherical wheel downward from the lower end of the corresponding leg. As weight is applied to the frame, the spherical caster wheel is pushed into the lower end of the leg, allowing the lower end of the leg to contact the ground surface and maintain stationary contact between the leg and the ground surface.

15 Claims, 6 Drawing Sheets

(56) References Cited

U.S. PATENT DOCUMENTS

| | | | | |
|---|---|---|---|---|
| 7,984,724 B1* | 7/2011 | Eberle | | A61H 3/04 224/407 |
| 8,087,126 B2* | 1/2012 | Duvert | | B60B 33/0057 16/33 |
| 8,166,988 B1* | 5/2012 | Martin | | A61H 3/04 482/68 |
| 8,720,914 B1* | 5/2014 | Heath | | A61H 3/008 280/87.021 |
| 9,198,823 B1* | 12/2015 | Whited | | A61H 3/04 |
| 9,211,000 B1* | 12/2015 | Storkel | | A61H 3/00 |
| 9,271,892 B1* | 3/2016 | Bement | | A61H 3/04 |
| 9,314,395 B1* | 4/2016 | VanAusdall | | B62B 3/02 |
| 11,253,418 B2 | 2/2022 | Liang | | |
| 2003/0070702 A1* | 4/2003 | Ownes | | A61H 3/00 135/74 |
| 2007/0152416 A1* | 7/2007 | Willis | | A61G 5/128 280/47.38 |
| 2007/0199586 A1* | 8/2007 | Cheng | | A61H 3/04 280/87.021 |
| 2008/0078431 A1* | 4/2008 | Battiston | | A61H 3/04 135/67 |
| 2009/0298653 A1 | 12/2009 | Rodetsky | | |
| 2009/0301533 A1* | 12/2009 | Caldwell | | A61H 3/04 135/67 |
| 2010/0263697 A1* | 10/2010 | Catton | | A61H 3/00 135/67 |
| 2011/0166753 A1* | 7/2011 | Yu | | A61H 3/061 180/19.2 |
| 2012/0048318 A1* | 3/2012 | Zendzian | | A61H 3/04 297/423.39 |
| 2012/0267488 A1* | 10/2012 | Fanourgiakis | | B60B 33/08 248/157 |
| 2013/0161135 A1* | 6/2013 | Kim | | F16D 49/00 188/74 |
| 2013/0214104 A1* | 8/2013 | Fanourgiakis | | B60B 33/0007 248/157 |
| 2013/0292916 A1* | 11/2013 | Nabeta | | A61H 3/04 280/47.371 |
| 2014/0125037 A1* | 5/2014 | Andersen | | A61H 3/04 280/47.38 |
| 2014/0238454 A1* | 8/2014 | Jordan | | A61H 3/04 29/401.1 |
| 2014/0265188 A1* | 9/2014 | Chang | | A61G 5/101 280/47.4 |
| 2015/0144166 A1* | 5/2015 | Turner | | A61H 3/00 135/77 |
| 2015/0245973 A1* | 9/2015 | Liu | | A61H 3/04 280/47.34 |
| 2015/0342822 A1* | 12/2015 | Osterhaus | | A61H 3/04 280/657 |
| 2016/0000636 A1* | 1/2016 | Jie | | B60B 33/063 280/47 |
| 2016/0081443 A1* | 3/2016 | Jordan | | A45B 9/04 135/67 |
| 2016/0287465 A1* | 10/2016 | Rabin | | B60L 3/0015 |
| 2016/0339742 A1* | 11/2016 | Libakken | | B60B 33/0015 |
| 2017/0087043 A1* | 3/2017 | Chang | | B60B 33/0063 |
| 2018/0084876 A1* | 3/2018 | Parkinson | | A45B 9/00 |
| 2018/0111417 A1* | 4/2018 | Metzdorf | | A47C 7/006 |
| 2018/0242700 A1 | 8/2018 | Kudronowicz | | |
| 2018/0319216 A1* | 11/2018 | Cherian | | B60B 33/08 |
| 2019/0231632 A1* | 8/2019 | Hoekelmann | | B60T 7/02 |
| 2020/0122505 A1* | 4/2020 | Zona | | B62K 5/025 |
| 2021/0154065 A1* | 5/2021 | Brown | | A61H 3/04 |
| 2021/0402254 A1* | 12/2021 | Briscoe | | A63B 21/00181 |

* cited by examiner

OMNIDIRECTIONAL SAFETY WALKER

RELATED APPLICATIONS

This application claims priority under 35 U.S.C. § 119(e) to U.S. Provisional Application No. 63/140,949, entitled "Omnidirectional Safety Walker", filed Jan. 24, 2021, which is fully incorporated herein by reference for all purposes.

BACKGROUND

The invention relates generally to safety walkers, and more particularly to safety walkers that use spherical caster wheels (also referred to herein simply as "spherical casters") to provide omnidirectional movement without having to overcome forces required to move, turn, or brake conventional casters. Optionally, embodiments may include a uniquely safe compression braking system and additional safety functions.

Embodiments of an omnidirectional safety walker disclosed herein use a novel design having spherical caster wheels and a uniquely safe compression braking system to provide unparalleled medical and safety functionality for those patients with mobility needs.

The global walking aids market was valued at $2.2 billion in 2018 and is projected to reach $3.7 billion in 2026, for a compound annual growth rate of 6.8%. The rising geriatric population with limited mobility and comorbidities such as arthritis, stroke, and Parkinson's Disease will primarily drive growth in this market. Currently available walkers have shortcomings that affect that mobility of the walkers and may make it difficult for some users to move, turn, or brake with the walkers. Embodiments of the present omnidirectional safety walker have improved mechanical designs that overcome the fundamental limitations of current walkers through the use of an omnidirectional rolling mechanism to seamlessly and effortlessly move in any direction.

Basic, conventional designs for walkers consist of a frame having four vertical legs and a pair of horizontal members which serve as handrails, handholds or hand grips which a user can grasp to provide the user with support. In this basic design, each of the four vertical legs simply has a rubber end cap at the bottom of the leg which helps to prevent the walker from sliding on the ground. In order to move the walker, the user must lift the walker, reposition it, and place it back on the ground. The end caps may also catch on edges of flooring or other similar features on the ground, potentially causing the user to lose their balance and fall. While tennis balls or other specialized end caps may be used on the bottom of the legs of this type of walker, users who are less mobile or weaker may encounter difficulties in using this basic walker design.

In order to make the walker easier to move, some later designed added wheels to the front legs of the walker. Initially, the wheels were fixed, so that they would roll either directly forward or directly backward. Typically, the rear legs would not have wheels, but would retain the rubber feet to give the walker stability when the user puts their weight on the handrails of the walker. These designs are still problematic, in that the wheels only role directly forward or backward, and if the user wishes to move to the right or left, the walker must be picked up and turned to face the desired direction for the wheels can be rolled in that direction. The user may therefore have limited mobility using this type of walker.

In more advanced existing designs, the fixed wheels are replaced with caster-type wheels. These caster wheels can turn to face different directions, after which they can roll in these different directions. This design is therefore easier for a user to turn then previous designs, giving the user better mobility. This design, however, still limits the user's directional mobility somewhat, as some amount of force must be applied to the casters to cause them to turn to face the desired direction before the wheels of the casters can move in that direction. Having to apply this force to turn the casters may provide difficulties for some users. Embodiments of the present omnidirectional safety walker significantly reduce the force required to turn the casters, thereby improving the mobility of the user.

Another problem with existing walkers is that most entry-level walkers do not have any type of braking system at all, other than the friction from the rubber end caps, tennis balls or similar devices on the bottom ends of the vertical legs. More advanced designs use a handbrake system similar to that of a bicycle to allow the user to control the movement of the walker. This type of handbrake, however, does not work well if the user has arthritis, a prosthetic appendage, limited movement from a stroke or movement disorders such as Parkinson's disease, or the like.

SUMMARY

In order to reduce or eliminate the problems above, embodiments of the present invention use spherical wheels to provide greater ease of movement so that less force is required to turn and move the walker. Additionally, an improved braking system that takes advantage of the user's weight to activate braking of the walker makes the apparatus easier to use.

Embodiments of the omni-directional safety walker may include an improved braking system that may help users who are unable to squeeze hand brakes due to arthritis, stroke, prosthetic limbs, or other movement disorders, and may provide additional levels of safety across various surfaces and inclines. Energy for additional functionality for optimal vital medical and safety could also be integrated with an onboard battery, or an energy harvesting system may be integrated with the omnidirectional rolling & braking mechanism. This functionality may include: voice activation, GPS tracking for both caregivers and Emergency Medical Services (EMS), a pedometer for tracking movement and to help guide doctors and physical therapists treatments, cell phone charging, angular sensing for fall monitoring that may trigger caregiver and EMS alerts, a number of alarms to alert people nearby, parabolic movement-triggered LED lights to provide improved visibility at night to prevent falls, Oxygen (O2) saturation monitor, pulse rate monitor, and single channel EKG that sends information to appropriate medical personnel. Additional functions may also be provided. These applications may help users of all disabilities and comorbidities with improvements in medical outcomes and safety.

One exemplary embodiment comprises a safety walker having a frame with a set of spherical caster wheels connected to the lower portion of the frame. The frame has an upper portion that includes one or more hand holds (e.g., handrails) adapted to enable a user to hold the frame. The hand holds also allow the user to move the frame or rest a portion of the user's body weight on the frame. The frame has a lower portion which includes the spherical wheels and is adapted to enable the frame to be supported on a surface such as the ground. The spherical caster wheels are connected to the lower portion of the frame (e.g., to the lower ends of a set of legs of the frame). The spherical caster wheels are configured to movably support the frame on the ground surface and are adapted to roll in any direction on the ground surface, regardless of any resting position of the spherical wheels on the ground surface.

In some embodiments, the walker also includes a brake connected to the lower portion of the frame, where when a weight exceeding a threshold weight is applied to the frame, the brake is engaged to inhibit movement of the frame on the ground surface. The brake may be implemented using a mechanism in which each spherical caster wheel is retractably mounted within a lower end of a corresponding leg of the frame. Each spherical wheel is spring-loaded to urge the spherical wheel downward from the lower end of the corresponding leg. When greater than a threshold weight is applied to the frame, the spherical caster wheel is pushed into a sleeve at the lower end of the leg, allowing the sleeve to contact the ground surface and maintain stationary contact between the leg and the ground surface. When less than the threshold weight is applied to the frame, each spherical wheel is extended by the corresponding spring beyond the lower end of the corresponding leg so that it contacts the ground surface and enables the frame to move by rolling contact of the spherical wheel with the ground surface. The threshold weight may be adjustable by adjusting the amount by which the springs are compressed between the spherical wheels and the frame of the walker. Each spherical wheel is adapted to roll in any direction on the ground surface, regardless of a resting position of the spherical caster wheel on the ground surface. A non-slip material may be provided at the lower end of each of the legs, so that when the legs contact the ground surface, the non-slip material inhibits movement between the legs and the ground surface.

In some embodiments, the lower portion of the frame has four downwardly extending legs, wherein each of the four legs has a corresponding one of the spherical caster wheels mounted thereon. In some embodiments, two of the four legs have corresponding ones of the spherical caster wheels mounted thereon, and two of the legs have corresponding fixed unidirectional wheels mounted thereon. In some embodiments, two of the four legs have corresponding ones of the spherical caster wheels mounted thereon, and two of the legs have corresponding stationary bumpers mounted thereon.

In some embodiments, each spherical caster wheel is movably mounted with respect to a corresponding one of the legs, the spherical caster wheel being movable from a first position in which the spherical caster wheel is unengaged by a braking surface and a second position in which the spherical caster wheel is engaged by the braking surface, wherein the spherical caster wheel is spring-loaded to urge the spherical caster wheel downward, away from the lower end of the leg and the braking surface. The braking surface may comprise a non-slip material mounted on the frame.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DESCRIPTION

There has never been a walker with full 360 degree omnidirectional movement. Even the most advanced existing designs cannot achieve this 360 degree movement. Additionally, current braking mechanisms have several weaknesses: friction from tennis balls or rubber stoppers do not provide precise control of speed and they do not provide any braking mechanism. Handbrake mechanisms provide such functionality, but they do not work well if the user has arthritis, a prosthetic appendage, limited movement from a stroke or movement disorders, etc.

Embodiments of the omni-directional safety walker provide solutions to two specific problems. First, in contrast to walkers that use fixed wheels or caster-type wheels, it allows 360-degree rotational movement without picking up or moving the unit, which is a limitation as with current medical walkers. In particular, it allows true lateral/perpendicular rolling movement, and significantly reduced turning force. Second, it allows for safer braking which utilizes the patient's own weight to stop without the need to squeeze a handbrake.

The first problem—full 360 degree omnidirectional movement—is addressed by the present embodiments through the use of spherical casters installed at the bottom of the legs of the walker. The omni-directional safety walker accomplishes full 360-degree movement with spherical balls that can freely rotate in a socket with minimal friction.

The spherical casters do not have to be turned in a particular direction before they are rolled in that direction, as is the case with conventional wheeled casters. They are always ready to move in any direction without first having to apply a force to turn the casters. Further the spherical casters are superior in full 360 degree omnidirectional movement relative to other omni-directional caster wheels such as omniwheels or mechanum wheels.

The second problem the omni-directional safety walker solves is related to the braking. Rather than using friction from a tennis ball or a rubber stop on the back posts to control the speed, or using a handbrake system, the omni-directional safety walker uses a compression brake that utilizes the patient's own weight to actuate the brake and stop the walker. The mechanism utilizes a sleeve attached to the front posts that surround the spherical wheel and is lined with rubber or equivalent friction material at the distal end. When there is no applied force on the walker handrails, the sleeve rests above the spherical wheel allowing the wheel full 360 degree omnidirectional movement. When there is applied force on the walker handrails the sleeve, which utilizes a compression spring mechanism, descends over the spherical wheel allowing the rubber part of the sleeve to make contact with the ground allowing the user to slow down or stop.

Optionally, an electrical braking system that may be powered by an onboard battery or energy harvesting mechanism can help govern the speed and control of the walker. Another option is the use of energy production and storage to enhance medical and safety functionality. The omni-directional safety walker can utilize a combination of an onboard battery and energy harvesting systems to power medical and safety functionality (e.g., that runs by a smartphone app). Potential smartphone functionality may include GPS tracking to help track loved ones, providing location information for Emergency Medical Services (EMS), physical activity tracking for caloric and energy measurements and to help guide doctors and physical therapists treatments. Additionally, the app may include a fall monitor that uses angle and time changes to trigger warnings, alarms and/or messages if the unit tips over during use.

The device may also include optional parabolic LED lights that activate after sensing movement to provide improved visibility at night to prevent falls, an Oxygen (O2) saturation monitor, pulse rate monitor, and single channel EKG that sends information to appropriate medical personnel through a WiFi or cellular signal. The parabolic LED lights can run independently or in conjunction with the smartphone. The smartphone features can also be voice activated. There are electronic device sockets as part of the battery unit that also includes cell phone charging (wired & wireless).

The omni-directional safety walker may also include other features, such as a safety seat that folds up and down and can support the user's weight while engaging the unique compression brake to improve user safety (in one embodiment, up to 300 lbs.) No other current available walker initiates braking in this manner. The height of the frame can also be adjusted so people of various heights can use it. The frame can also fold onto itself to provide easier storage. There may also be a storage pack (similar to a fanny pack) for personal storage, a cup/water bottle holder, a soft sweat resistant foam rubber lining the handrails for improved grip and traction.

While specific exemplary embodiments of the invention are described below, numerous alternative embodiments are also possible.

Figure 1:
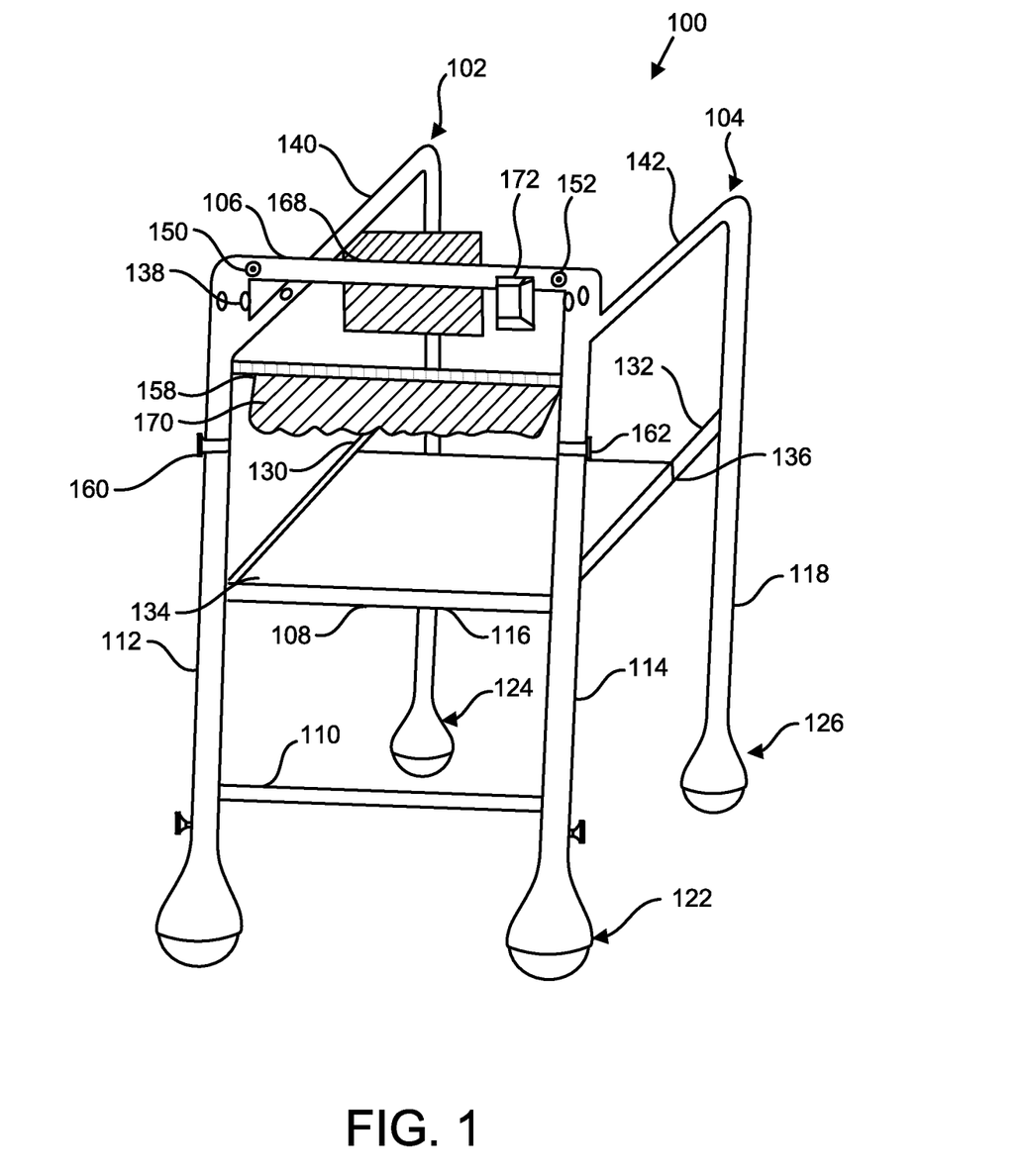
FIG. 1 is a diagram illustrating a perspective view of an omni-directional safety walker in accordance with one embodiment.

Referring to FIG. 1, an example embodiment of the omni-directional safety walker 100 is shown. In this embodiment, the structural frame of the omni-directional safety walker is designed with a frame constructed from a lightweight, high strength material such as carbon fiber, aluminum or alloy for strength and durability. The basic frame design has some similarities to other walkers, but has several distinctive features as explained noted below.

In the embodiment of FIG. 1, the frame is hollow (tubular) and consists of two modified upside down U's (102, 104) which are attached to each other by a set of horizontal bars (106, 108, 110) to form a single, stable unit for the walker. The upside down U's provide four vertical legs (112, 114, 116, 118), each of which has a ground contact point on its lower end. As will be discussed in more detail below, the ground contact points may be spherical casters, conventional wheels, conventional wheeled casters, or fixed feet (e.g., rubber bumpers, tennis balls, etc.)

Figure 2A:
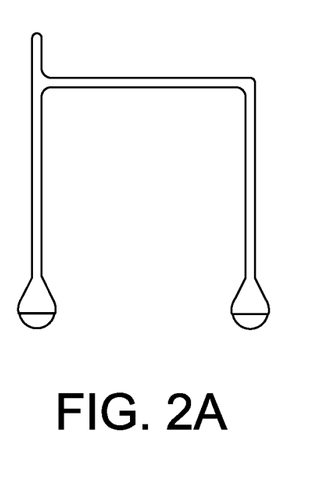
FIGS. 2A-2C are diagrams illustrating side views of omni-directional safety walkers in accordance with several alternative embodiments.
Figure 2B:
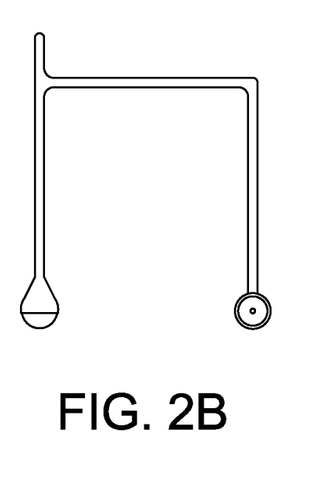
Figure 2C:
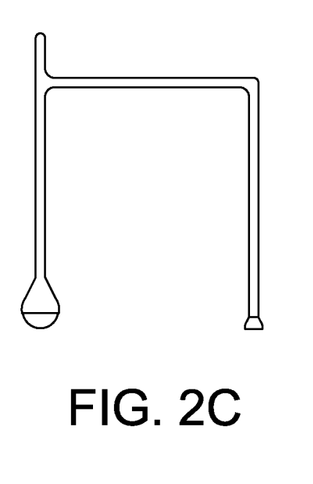

Each of the legs in this embodiment has a large spherical caster (120, 122, 124, 126)—a spherical wheel housed in a ball socket, where either the spherical wheel or the socket makes contact with the ground. In some alternative embodiments, the walker may have two conventional fixed wheels or conventional caster wheels instead of the back two spherical wheels in order to provide greater lateral stability when moving in certain directions (if, for example, the user needs less lateral movement). FIGS. 2A-2C illustrate these different embodiments. FIG. 2A depicts a side view of an embodiment that uses spherical casters on both the front and back legs, while FIG. 2B shows a side view of an embodiment that uses spherical casters on the front and a fixed wheel on each of the back legs, and FIG. 2C shows a side view of an embodiment that uses spherical casters on the front and fixed rubber bumpers on the back legs.

The four large casters are spherical and have no restriction of movement in any direction. (The spherical casters may also be referred to herein as "spherical wheels", or "spherical casters.") Using large spheres as wheels provides full 360 degree omnidirectional movement without the need to apply the initial wheel turning activation force required by a conventional caster. In particular, the four large spheres significantly reduce the force for users to move in a lateral/perpendicular fashion to their current path of travel. Furthermore, the four large spheres eliminate the need to use a handbrake while turning, moving in tight quarters, and significantly reduces the force users need to exert to complete the turn.

In some embodiments, the large spherical wheels are partially covered by a sleeve that is attached to the frame. The sleeve may be integral to the frame of the walker. In some embodiments, the sleeve and the frame may be formed using carbon fiber. For example, the carbon fiber sleeve may be attached to the frame, while the spherical caster is movably attached to a compression spring which allows the position of the spherical caster to move between a position in which it extends beyond the end of the sleeve and contacts the ground, and a position in which it is retracted into the sleeve and the sleeve itself contacts the ground and therefore serves as a brake for the walker. This is described in more detail below in connection with FIGS. 3-6.

The compression spring urges the spherical caster toward the first position in which the spherical caster is in contact with the ground and enables the walker to roll in any direction on the ground. The compression spring in some embodiments has a mechanism that allows the tension to be adjustable in order to accommodate different weights of different users. The tension can be increased to support heavier users (e.g., up to 300 lbs.) or lighter users. Various different mechanisms can be used to adjust the spring tension. In some embodiments, for example, the position of a frame spring stop may be adjusted so that the degree to which a spring is compressed between a stop on the movable vertical shaft of the spherical caster and the frame spring stop is adjustable. Preferably, the spring compression mechanism is adjustable using a simple external device (e.g., by turning a tension adjustment knob).

The top of the walker has handrails (140, 142) that have a step off from the front of the walker such that when the users push down to initiate the compression braking, the walker does not tip over. As the user grips on to the handrails of the walker, applying the user's body weight downward allows the sleeves over the spherical wheels to slide over the spherical wheels until the sleeves make contact with the ground. The bottom of the sleeve may be lined with rubber or a some other non-slip material to provide increased friction between the frame and the ground. This increased friction will stop the walker from moving. When the user releases their applied body weight from the handrails, the springs are under less compression, allowing the sleeve to raise up above the spherical wheel. This allows the spherical wheel full rotational movement so that the walker can be moved without being picked up.

Figure 3:
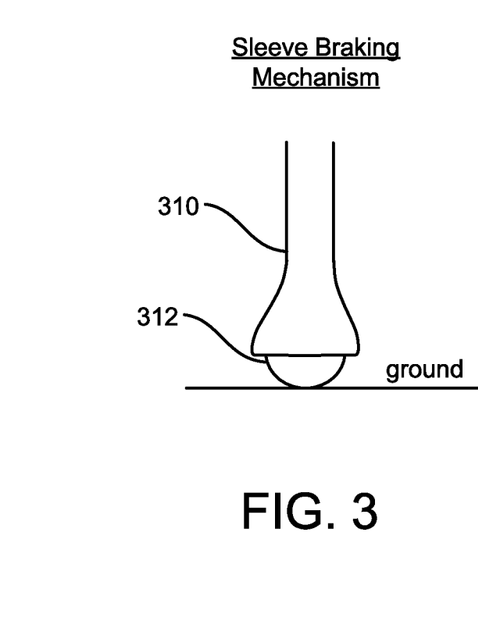
FIGS. 3 and 4 are diagrams illustrating the operation of a sleeve braking mechanism used in conjunction with a spherical caster of an omni-directional safety walker in accordance with one embodiment.
Figure 4:
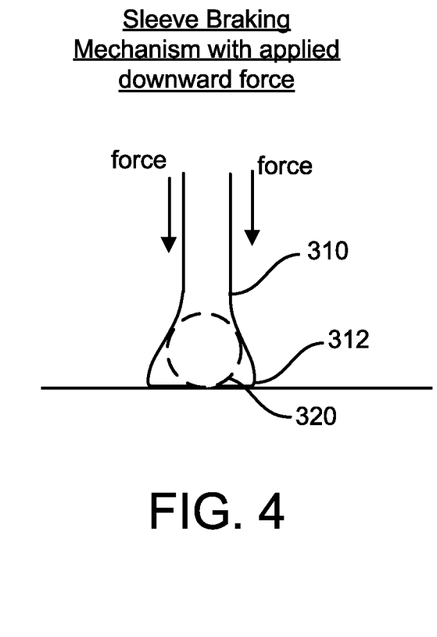
Figure 5:
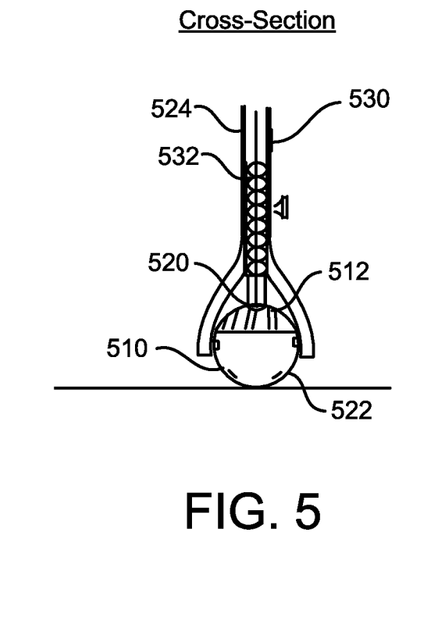
FIG. 5 is a diagram illustrating a cross-sectional view of a sleeve braking mechanism used in conjunction with a spherical caster of an omni-directional safety walker in accordance with one embodiment.

As noted above, the arrangement of the spherical wheels and corresponding sleeves are shown in more detail in FIGS. 3-6. FIGS. 3 and 4 show the change in the respective positions of the spherical wheels and sleeves when the user's weight is applied to the walker frame or removed from the frame. FIG. 5 shows the general relationship of the spherical wheels and compression springs within the sleeves/frame. FIGS. 6A and 6B show in more detail the structure of the spherical wheels, springs and sleeves in two alternative embodiments.

Referring to FIG. 3, the relative positions of the sleeve 310 and spherical wheel 320 are shown when there is no weight applied to the frame (e.g., when the walker is not being used). Since there is no weight (other than the weight of the walker itself) forcing the frame downward, the spherical wheel extends downward from the bottom end of the sleeve and is allowed to roll freely. The walker can therefore be moved easily in any direction.

Referring to FIG. 4, the relative positions of the sleeve 310 and spherical wheel 320 are shown the user's weight is applied to the frame (e.g., when the user is pressing down on the handrails and supporting their weight on the walker). The downward force on the frame causes the frame to move downward, compressing the spring. The bottom end of the sleeve contacts the ground, and friction between the sleeve and the ground prevents the frame from being moved. As noted above, a rubber or similar material may be provided at the lower end of the sleeve to provide increased friction between the sleeve and the ground, and to thereby enhance the braking effect and prevent movement of the frame.

While FIGS. 3 and 4 show the positions of the spherical wheel and sleeve with no weight and the user's weight applied to the frame, it should be noted that the spring will gradually compress as more weight is applied to the frame. Consequently, the space between the bottom of the sleeve and the ground will gradually decrease as more weight is applied to the frame. The frame will touch the ground when the amount of weight applied to the frame is sufficient to compress the spring by an amount equal to the space between the sleeve and the ground when no weigh is applied. Thus, the amount of weight that must be applied to the frame to achieve braking of the frame depends upon the original sleeve-ground spacing and the compressibility of the spring. In some embodiments, an adjustment mechanism may be provided to change the position or compression of the spring, thereby adjusting the amount of weight that must be applied to the frame to achieve sleeve-to-ground contact and resulting braking of the frame.

Referring to FIG. 5, the spherical wheel and braking mechanism are illustrated in a cutaway view to show some of the related components. As depicted in this figure, the spherical wheel 510 is positioned in a socket 512 which is movably attached to the frame. The spherical wheel moves freely within the socket. Compression spring 520 within the frame urges socket 512 and spherical wheel 510 downward, but allows them to move upward when the spring is compressed.

In this embodiment, socket 512 has a magnetic sensor 520 such as a wire coil positioned therein. The sensor is coupled to energy harvesting circuitry mounted in/on the frame. Spherical wheel 510 has a set of magnets (e.g., 522) embedded in it so that when the spherical wheel rotates, the magnetic fields produced by the embedded magnets create variations in the magnetic flux through the coil and induce electrical currents in the coil. These currents are provided via wire 524 that travels through the hollow frame to the energy harvesting circuitry. The current is used to recharge a battery or other energy storage device (not shown in the figure) that may be housed, for example, in one of the front horizontal bars of the walker frame.

The embodiment of FIG. 5 also has an energy harvesting mechanism coupled to the compression spring. In this embodiment, a piezoelectric device 530 is coupled to the upper end of spring 532. As weight is applied to or removed from the frame of the walker, spring 532 is compressed or decompressed, causing a varying amount of pressure to be applied to piezoelectric device 530. The changes in pressure cause charge to be generated by the piezoelectric device, which can be converted to electrical current. This current is used to recharge a battery or other energy storage device.

Compression spring 532 may alternatively be coupled to a kinetic energy converter that creates electrical energy as the compression spring is used. This kinetic energy converter may, for example, use a moving coil and magnet mechanism to generate electricity from the movement of the spring within the walker. The kinetic energy converter would send the generated energy through a wire to a rechargeable battery or energy storage device.

Alternative embodiments may also utilize a kinetic energy converter that utilizes the actual undulating movement of the walker to generate energy. As the walker moves, the created electrical energy may be used to recharge a battery or other energy storage device. Another energy source that may be used comprises a solar panel strip (see FIG. 1, 158) that may be positioned, for example, on one of the horizontal bars of the walker frame. Again, the harvested energy would be used to recharge an on-board energy storage device such as a rechargeable battery.

Figure 6:
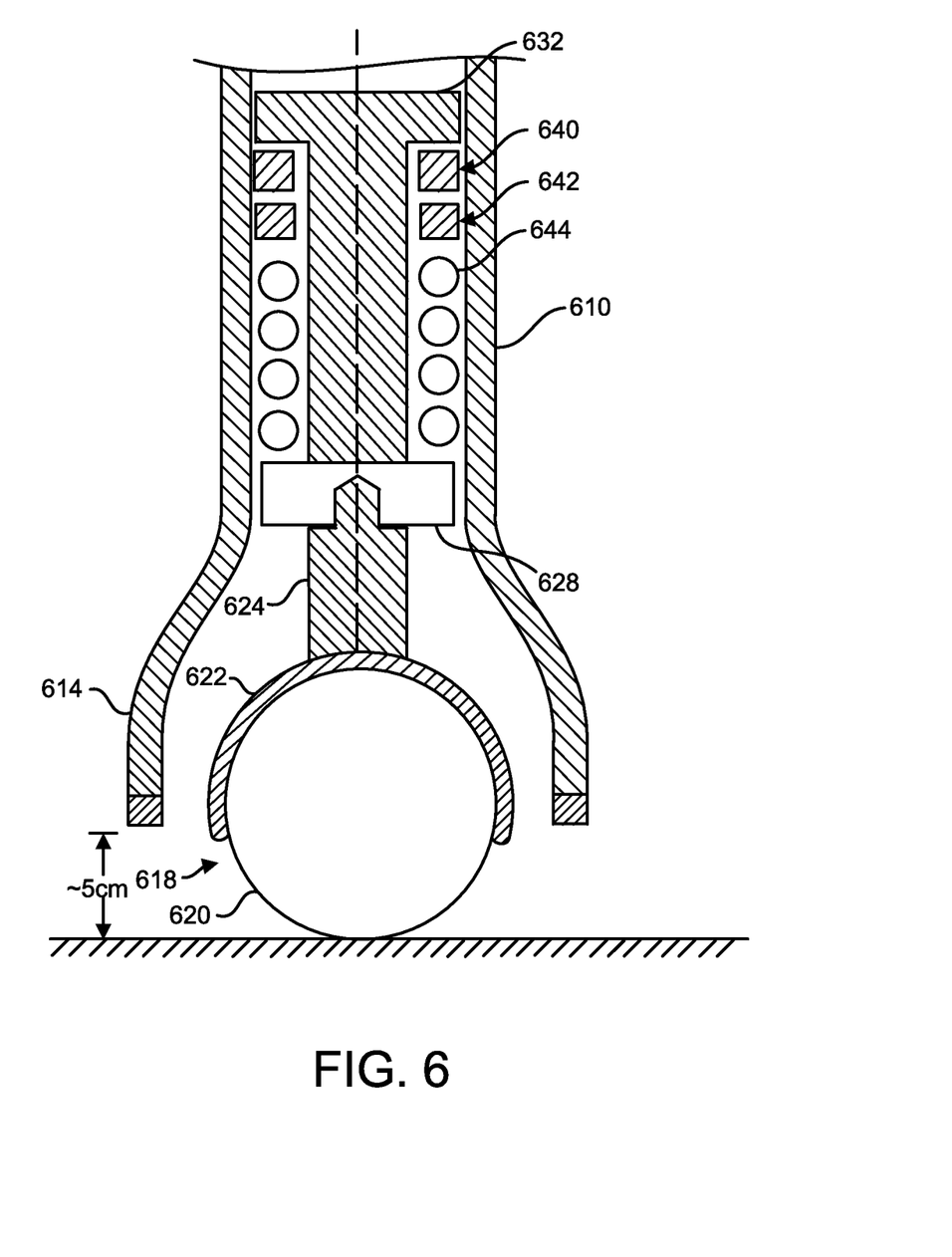
FIG. 6 is a diagram illustrating a detailed cross-sectional view of a sleeve braking mechanism used in conjunction with a spherical caster of an omni-directional safety walker in accordance with one embodiment.

Referring to FIG. 6, a more detailed diagram illustrating the spherical wheel and braking system in one embodiment is shown. In this embodiment, the spherical wheel and braking system is housed in the lower end of a leg of the walker frame. The lower end of tubular leg 610 expands to form sleeve 614. A rubber brake surface 614 is provided at the lower end of sleeve 614 to increase the friction between A spherical wheel 618 is installed within sleeve 614 so that it can move vertically within the sleeve (at times extending below the lower end of the sleeve). The spherical wheel includes a ball 620 which fits within a socket 622. An attachment portion 624 extends upward from the top of socket 622. Attachment portion 624 is secured to a lower plate 628 (e.g., by screwing a threaded bolt at the top of the attachment portion into a threaded hole in the bottom of the lower plate).

Lower plate 624 is coupled to a shaft 630 which extends upward through tubular leg 610. An upper plate 632 is formed at the upper end of shaft 630. A shaft stop 640 is positioned around shaft 630 below upper plate 632 to limit the travel of the shaft and to prevent the spherical wheel from extending more than a desired amount below the lower end of sleeve 614.

A compression adjustment stop 642 is positioned below shaft stop 640. Compression spring 644 is positioned in the annular region between tubular leg 610 and shaft 630. Spring 644 is compressed between compression adjustment stop 642 and lower plate 628. As weight is applied to the frame, spherical wheel 618 is forced upward into sleeve 614. This also forces lower plate 628 upward, compressing spring 644 until the lower end of sleeve 614 contacts the ground and brakes the frame. When the weight is removed from the frame, spring 644 pushes spherical wheel 618 downward so that it extends beyond the lower end of sleeve 614, allowing the spherical wheel to roll. Compression adjustment stop 642 is movable upward or downward to adjust the amount of force that is required to cause the spherical wheel to be forced upward into the sleeve.

Figure 7:
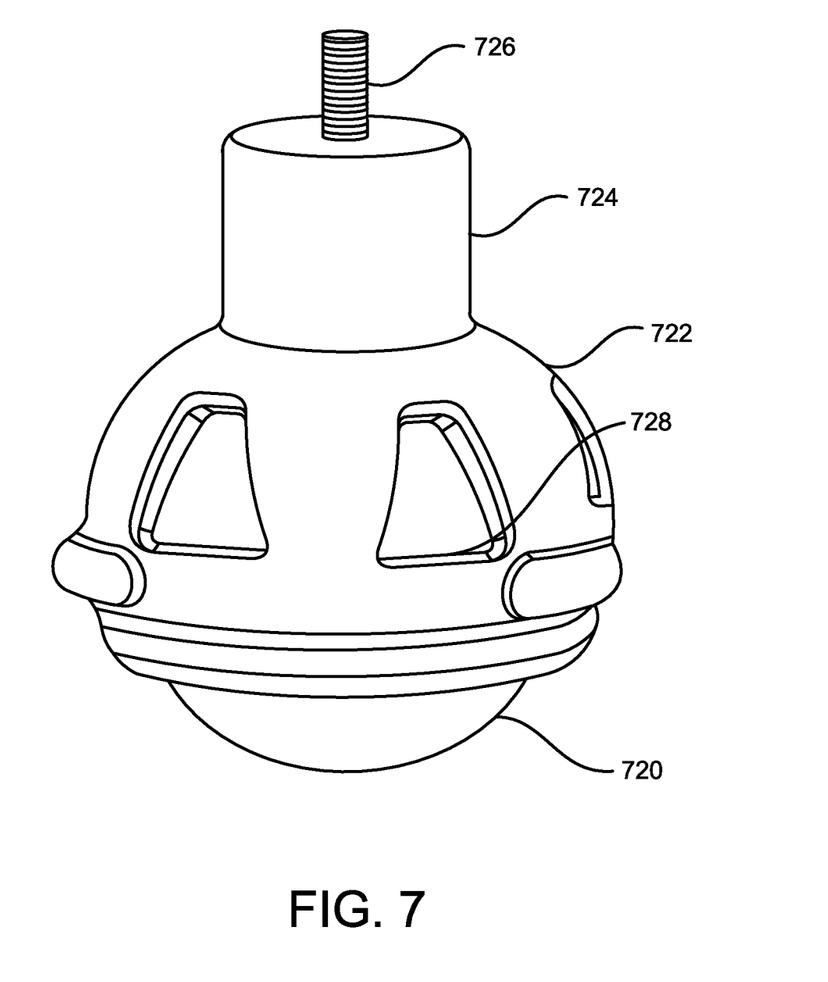
FIG. 7 is a diagram illustrating a spherical caster that may be used in an omni-directional safety walker in accordance with some embodiments.

Referring to FIG. 7, an example of the type of spherical wheel that may be used in the embodiments disclosed herein is shown. In this example, spherical wheel has a ball 720 that is positioned within a socket portion 722 of the device. Attachment portion 724 extends upward from socket portion 722, and a stud 726 extends upward from attachment portion 724. This spherical wheel has a series of openings 728 in socket portion 722. Ball 720 is exposed through the openings, and it is possible with this type of spherical wheel to use a braking mechanism in which applying the user's weight to the frame causes a braking surface to be applied to the surface of ball 720 through the openings. In such an embodiment, the ball would remain in contact with the ground, but it would be prevented from rolling by contact between the braking surface and the ball surface, rather than contact between the braking surface and the ground.

Figure 8A:
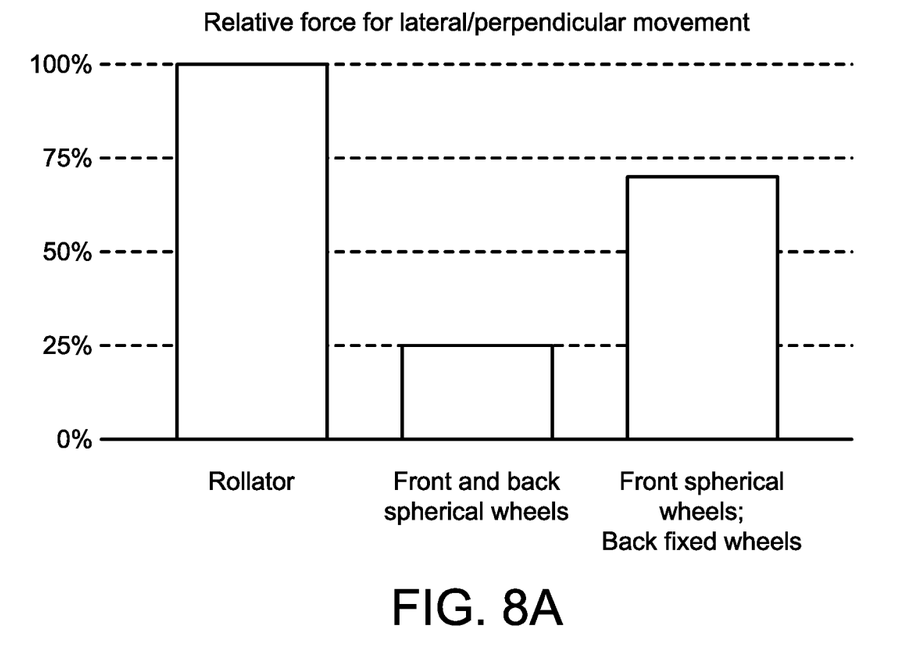
FIGS. 8A and 8B are bar charts illustrating the effect of using spherical wheels on the legs of a walker on the force required to move or turn the walker in comparison to a current rollator design.
Figure 8B:
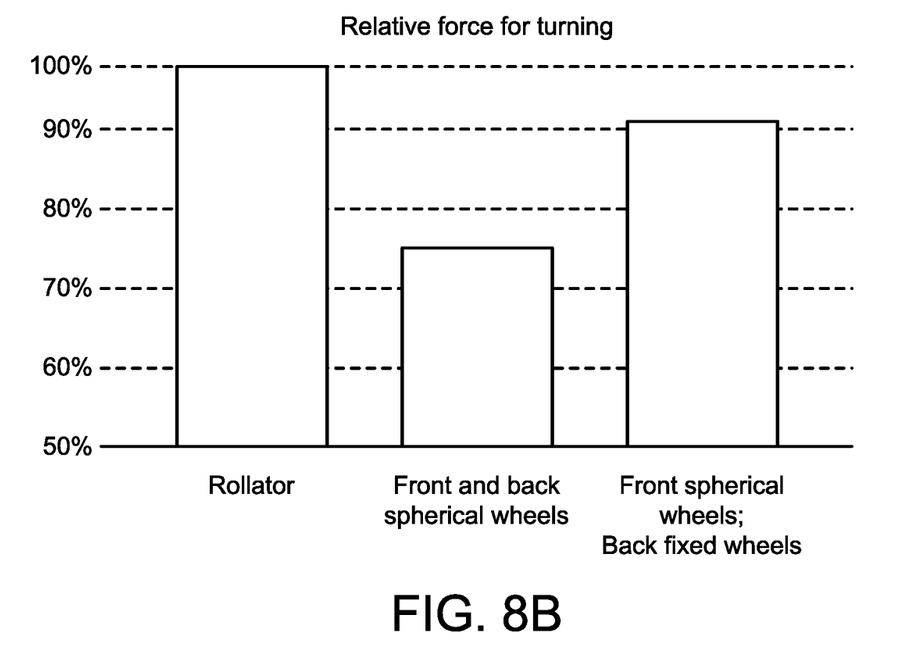

Referring to FIGS. 8A and 8B, a pair of bar charts illustrating the effect of using spherical wheels on the legs of a walker are shown. In each of the charts, the three bars represent the force required to move a rollator type walker (which has conventional wheeled casters on the front legs of the walker and fixed wheels on the rear legs of the walker), an embodiment of the present walker that uses spherical wheels on all four legs of the walker, and an embodiment of the present walker that uses spherical wheels on all the two front legs of the walker and fixed wheels on the two rear legs of the walker. The charts are normalized so that the force required for the rollator type walker is 100%, and the embodiments of the present invention are shown as a percentage of the force required by the rollator walker.

FIG. 8A shows relative force required for lateral/perpendicular movement of the corresponding walker. "Lateral/perpendicular" movement refers to movement that is perpendicular to the direction in which the casters/wheels are facing. In order for a rollator walker to move in this direction, it is necessary to apply some amount of force to turn the conventional caster wheels toward the desired direction of movement before the walker can be moved in that direction. Since the fixed wheels cannot turn toward the direction of movement, the front legs of the walker will be moved in the desired direction, and then the rear legs will follow as the direction of the walker is changed. In the case of the present embodiment having four spherical wheels, all four legs can immediately be moved in the desired direction without having to apply any force to change the direction of the spherical wheels (which are omnidirectional). In the case of the present embodiment having two spherical wheels, the front legs can immediately move in the desired direction without having to apply any force to change the direction of the omnidirectional spherical wheels. The rear legs with the fixed wheels will, similar to the rollator, follow the front legs.

It can be seen from FIG. 8A that the required force for lateral/perpendicular movement of the four-spherical-wheel walker is approximately 25% of the force required for a rollator type walker. The force required by the two-spherical-wheel walker is approximately 70% of the force required for a rollator type walker. Thus, the use of spherical wheels on either two or four of the walker legs results in a substantial reduction of the force required to move the walker in a lateral/perpendicular direction.

FIG. 8B shows relative force required for turning the corresponding walker. Again, turning the rollator type walker requires that some amount of force be applied to turn the conventional caster wheels before the walker can be turned. When four spherical wheels are used on the legs, they can all be immediately moved in the desired direction without having to apply any force to change the direction of the omnidirectional spherical wheels. If two spherical wheels are used, the front legs can immediately move in the desired direction without having to apply any force to change the direction of the spherical wheels. FIG. 8B shows that the required force for turning the four-spherical-wheel walker is approximately 75% of the force required for a rollator type walker. The force required by the two-spherical-wheel walker is just over 90% of the force required for a rollator type walker. The use of spherical wheels on either two or four of the walker legs therefore results in a reduction of the force required to turn the walker, as well as the force required to move the walker in a lateral/perpendicular direction.

Referring again to FIG. 1, a number of additional details and features that may be implemented in some embodiments of the present invention are also shown. For instance, each of the inverted U-shaped side frames (102, 104) has an intermediate horizontal bar (130, 132) that provides some additional stability between the corresponding two legs, and also provides a structure to support a foldable seat 134 which is pivotally attached to the front legs (112, 114). When foldable seat 134 is not being used, it is folded up so that it extends vertically at the front of the walker. The seat can be held in the vertical position by a hook 138 or similar means. When it is desired to use the seat, the seat is folded down and the end of the seat facing the user is secured to the horizontal side members (130, 132) by a corresponding hook (136) or some other means. Additionally, when the user sits on the seat, the compression braking mechanism becomes automatically engaged, which significantly improves user safety and eliminates common safety issues such as the walker sliding when the user sits down without handbrakes fully engaged.

One embodiment includes LED lights 150, 152 (e.g., parabolic LED lights) that are connected to the battery and energy harvesting system. A movement sensor may be provided so that, as the walker moves, the sensor may automatically turn on the LED lights to aid the user. A light sensor may be used to sense the ambient light and to turn on the LED lights only if there is a limited amount of ambient light and limited visibility. The parabolic LED lights may be adapted to run independently or in conjunction with a smartphone. The smartphone features can also be voice activated.

Some embodiments of the walker have an adjustable-height frame. The height of the frame can be adjusted by releasing a lever 160, 162 on each side of the top part of the frame. The walker can be adjusted to accommodate, for example, up to a 7 foot tall person. The walker can be folded such that it is flat, to allow for easy storage and transportation. As noted above, the compression of the springs coupled to the spherical wheels can be adjusted (e.g., using compression regulator knobs 164, 166) to accommodate users of different weights, by adjusting the amount of weight required to engage the braking system.

Some embodiments may be operatively coupled to a smartphone app through a physical connection 168 (e.g., an appropriate cable connected to the smartphone and the corresponding subsystems of the walker) or through wireless means (e.g., via a bluetooth or similar communication link). When the smartphone app is turned on, functions such as GPS tracking can be provided to help track the user so Emergency Medical Services (EMS) or family can locate the user. The smartphone app and phone sensors may also be configured to function as a fall monitor that uses angle and time changes to trigger warnings, alarms and/or messages if the unit tips over during usage. The LED lights may also be turned on in response to sensing movement to provide improved visibility at night or after falls.

The smartphone app may be coupled to an electrical braking system to help govern speed and to stop the walker if the user is unable to use the compression braking system. The smartphone app may further be coupled to an appropriate oxygen (O2) saturation monitor, pulse rate monitor, single channel EKG or similar subsystems to send information to appropriate medical personnel via a WiFi or cellular signal.

In some embodiments, electrical device sockets may be provided as part of the battery unit that so that the system can be used to provide cell phone charging (wired & wireless) and/or to easily charge the onboard battery.

Some embodiments may include a storage compartment 170 (e.g., a pack such similar to a zippered fanny pack) which is attached to the frame at a suitable location (e.g., on the front horizontal bar) for easy access to personal storage items. The walker also optionally has a cup/bottle holder 172 secured to the frame.

The omni-directional safety walker may include various combinations of the features identified above. A given embodiment need not include all of these features. For example, the walker can be used with or without the energy harvesting mechanism, or some embodiments may include the smartphone features while others do not. It should be noted that, although the embodiments illustrated and described in detail above have weight-activated braking, the spherical wheels may additionally incorporate conventional braking elements (e.g., traditional hand braking).

The omni-directional safety walker described above provides improved functionality through easier and safer turning due to its spherical rollers, improved mechanical braking, as well as improved monitoring and operational features which are enabled through a smartphone and app integration. Variations of these features specific to spherical roller designs, as well as the variations in smartphone sensor outputs and similar messaging options are contemplated in the description above.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A safety walker comprising:
   a frame,
      the frame having an upper portion that includes one or more hand holds adapted to enable a user to hold the frame,
      the frame also having a lower portion adapted to enable the frame to be supported on a ground surface;
   a set of spherical caster wheels connected to the lower portion of the frame, the spherical caster wheels configured to movably support the frame on the ground surface, each of the spherical caster wheels adapted to roll in any direction on the around surface, regardless of a resting position of the spherical caster wheels on the around surface; and
   a brake connected to the lower portion of the frame, wherein when greater than a threshold weight is applied to the frame, the brake is engaged to inhibit movement of the frame on the around surface
   wherein each spherical caster wheel is retractably mounted within a lower end of a corresponding one of a plurality of leas of the frame, each spherical caster wheel being spring-loaded to urge the spherical caster wheel downward from the lower end of the corresponding leg;
   wherein when greater than a threshold weight is applied to the frame, the spherical caster wheel is retracted into the lower end of the corresponding leg, allowing the lower end of the corresponding leg to contact the around surface and maintain stationary contact between the lower end of the corresponding leg and the ground surface;
   wherein when less than the threshold weight is applied to the frame, each spherical caster wheel extends beyond the lower end of the corresponding leg and contacts a around surface, enabling the frame to move by rolling contact of the spherical caster wheel with the around surface, wherein each spherical caster wheel is adapted to roll in any direction on the around surface, regardless of a resting position of the spherical caster wheel on the around surface;
   the safety walker further comprising, for each of the spherical caster wheels, a compression adjustment which is manually configurable by a user to change a compression of a corresponding spring wherein adjustment of the compression changes the threshold weight required to cause the corresponding leg to contact the ground surface.

2. The safety walker of claim 1, wherein the compression adjustment comprises a movable spring stop positioned against a first end of the spring, and wherein a second, opposing end of the spring contacts a movable structure that supports the spherical caster wheel.

3. The safety walker of claim 1, further comprising one or more energy harvesters coupled to the safety walker and configured to generate electrical energy that is provided to an on-board energy store.

4. The safety walker of claim 1, wherein the lower portion of the frame has four downwardly extending legs, wherein each of the four legs has a corresponding one of the spherical caster wheels mounted thereon.

5. The safety walker of claim 1, wherein the lower portion of the frame has four downwardly extending legs, wherein two of the four legs have corresponding ones of the spherical caster wheels mounted thereon, and wherein two of the four legs have corresponding unidirectional wheels mounted thereon.

6. The safety walker of claim 1, wherein the lower portion of the frame has four downwardly extending legs, wherein two of the four legs have corresponding ones of the spherical caster wheels mounted thereon, and wherein two of the four legs have corresponding stationary bumpers mounted thereon.

7. The safety walker of claim 1, further comprising a non-slip material mounted at the lower end of each of the legs, wherein when the legs contact the ground surface, the non-slip material inhibits movement between the legs and the ground surface.

8. A safety walker comprising:
   a frame,
      the frame having an upper portion that includes one or more hand holds adapted to enable a user to hold the frame,
      the frame also having a lower portion adapted to enable the frame to be supported on a ground surface;
   a set of spherical caster wheels connected to the lower portion of the frame, the spherical caster wheels configured to movably support the frame on the ground surface, each of the spherical caster wheels adapted to roll in any direction on the around surface, regardless of a resting position of the spherical caster wheels on the ground surface; and
   a brake connected to the lower portion of the frame, wherein when greater than a threshold weight is applied to the frame, the brake is engaged to inhibit movement of the frame on the around surface
   wherein each spherical caster wheel is retractably mounted within a lower end of a corresponding one of a plurality of legs of the frame, each spherical caster wheel being spring-loaded to urge the spherical caster wheel downward from the lower end of the corresponding leg;
   wherein when greater than a threshold weight is applied to the frame, the spherical caster wheel is retracted into the lower end of the corresponding leg, allowing the lower end of the corresponding leg to contact the ground surface and maintain stationary contact between the lower end of the corresponding leg and the ground surface;
   wherein when less than the threshold weight is applied to the frame, each spherical caster wheel extends beyond the lower end of the corresponding leg and contacts a ground surface, enabling the frame to move by rolling contact of the spherical caster wheel with the ground surface, wherein each spherical caster wheel is adapted to roll in any direction on the ground surface, regardless of a resting position of the spherical caster wheel on the ground surface;
   the walker further comprising one or more energy harvesters coupled to the safety walker and configured to generate electrical energy that is provided to an on-board energy store, wherein the one or more energy harvesters comprise at least one piezoelectric energy converter coupled to a compression spring which is compressed by a corresponding one of the spherical caster wheels, the piezoelectric energy converter adapted to generate the electrical energy from variations in a pressure applied by the compression spring to the piezoelectric energy converter.

9. The safety walker of claim 8, wherein the lower portion of the frame has four downwardly extending legs, wherein each of the four legs has a corresponding one of the spherical caster wheels mounted thereon.

10. The safety walker of claim 8, wherein the lower portion of the frame has four downwardly extending legs, wherein two of the four legs have corresponding ones of the spherical caster wheels mounted thereon, and wherein two of the four legs have corresponding unidirectional wheels mounted thereon.

11. The safety walker of claim 8, wherein the lower portion of the frame has four downwardly extending legs, wherein two of the four legs have corresponding ones of the spherical caster wheels mounted thereon, and wherein two of the four legs have corresponding stationary bumpers mounted thereon.

12. The safety walker of claim 8, wherein the lower portion of the frame has four downwardly extending legs, wherein each of the four legs has a corresponding one of the spherical caster wheels mounted thereon.

13. The safety walker of claim 8, wherein the lower portion of the frame has four downwardly extending legs, wherein two of the four legs have corresponding ones of the spherical caster wheels mounted thereon, and wherein two of the four legs have corresponding unidirectional wheels mounted thereon.

14. The safety walker of claim 8, wherein the lower portion of the frame has four downwardly extending legs, wherein two of the four legs have corresponding ones of the spherical caster wheels mounted thereon, and wherein two of the four legs have corresponding stationary bumpers mounted thereon.

15. A safety walker comprising:
a frame,
the frame having an upper portion that includes one or more hand holds adapted to enable a user to hold the frame,
the frame also having a lower portion adapted to enable the frame to be supported on a ground surface;
a set of spherical caster wheels connected to the lower portion of the frame, the spherical caster wheels configured to movably support the frame on the ground surface, each of the spherical caster wheels adapted to roll in any direction on the ground surface, regardless of a resting position of the spherical caster wheels on the ground surface; and
a brake connected to the lower portion of the frame, wherein when greater than a threshold weight is applied to the frame, the brake is engaged to inhibit movement of the frame on the around surface
wherein each spherical caster wheel is retractably mounted within a lower end of a corresponding one of a plurality of legs of the frame, each spherical caster wheel being spring-loaded to urge the spherical caster wheel downward from the lower end of the corresponding leg;
wherein when greater than a threshold weight is applied to the frame, the spherical caster wheel is retracted into the lower end of the corresponding leg, allowing the lower end of the corresponding leg to contact the ground surface and maintain stationary contact between the lower end of the corresponding leg and the ground surface;
wherein when less than the threshold weight is applied to the frame, each spherical caster wheel extends beyond the lower end of the corresponding leg and contacts a ground surface, enabling the frame to move by rolling contact of the spherical caster wheel with the around surface, wherein each spherical caster wheel is adapted to roll in any direction on the around surface, regardless of a resting position of the spherical caster wheel on the ground surface;
the walker further comprising one or more energy harvesters coupled to the safety walker and configured to generate electrical energy that is provided to an on-board energy store, wherein the one or more energy harvesters comprise one or more coils and one or more permanent magnets, the one or more magnets configured to be movable with respect to the one or more coils, wherein currents induced in the one or more coils by relative movement of the one or more magnets are provided to the on-board energy store;
wherein either: the one or more coils are positioned on a socket of one of the spherical caster wheels and the one or more magnets are embedded in a ball of the one of the spherical caster wheels; or the one or more coils are positioned on a movable structure that supports one of the spherical caster wheels and the one or more magnets are positioned on the frame.

* * * * *